(No Model.)

G. S. ROMINGER.
COMPENSATING JOURNAL.

No. 276,287. Patented Apr. 24, 1883.

WITNESSES
Wm A. Skinkle
Edwin A. Newman.

INVENTOR
George S. Rominger
By his Attorneys
Baldwin, Hopkins & Peyton

UNITED STATES PATENT OFFICE.

GEORGE S. ROMINGER, OF PHILADELPHIA, PENNSYLVANIA, ASSIGNOR TO THE AMERICAN BUTTONHOLE, OVERSEAMING AND SEWING MACHINE COMPANY, OF SAME PLACE.

COMPENSATING-JOURNAL.

SPECIFICATION forming part of Letters Patent No. 276,287, dated April 24, 1883.

Application filed March 24, 1883. (No model.)

*To all whom it may concern:*

Be it known that I, GEORGE S. ROMINGER, a citizen of the United States, residing in the city and county of Philadelphia, and State of Pennsylvania, have invented certain new and useful Improvements in Compensating-Journals, of which the following is a specification.

The invention is designed more especially for stud-journals for sewing-machine flywheels and similar light machinery, although I do not of course limit it to any special class of apparatus. In my organization the hub of the fly or balance wheel is journaled between cone-bearings, one of which is adjustable toward the other to compensate for wear.

I am aware that broadly such cone-bearings are old, and I do not therefore make any claim to such broad ground.

My invention consists primarily in the means for adjusting the movable bearing-cone.

Figure 1:
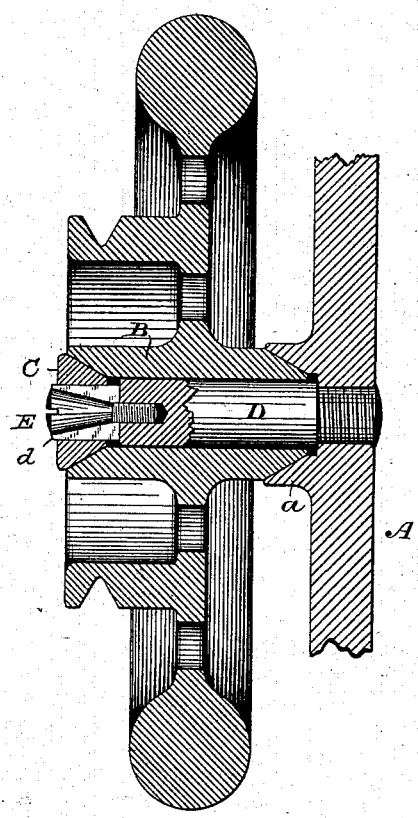
Figure 2:
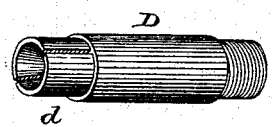

In the accompanying drawings, Figure 1 is a sectional view with the journal-stud partly broken away, and Fig. 2 is a detailed perspective view of the journal-stud.

The frame A of the machine has formed thereon the inner conical bearing, $a$, into which the correspondingly conically-shaped end of the hub B projects and has its bearing. The opposite adjustable conical bearing, C, is carried upon the outer end of the stud-journal shaft D, and is adjusted and held in any desired position in the following manner: The end $d$ of the shaft D is of smaller diameter than the main portion, and is conically socketed for the reception of the correspondingly-shaped head of the screw E, the straight end of which screws into the straight threaded extension of the conical socket. The reduced end of the stud-journal on which the conical bearing or follower C slides is split longitudinally, and the adjustable bearing is held thereon in the desired position by screwing up the conically-headed screw E and expanding the sections of the split end $d$ against the inner walls of the movable bearing. By this construction I obtain a smooth unbroken bearing-surface, which may be adjusted readily with the greatest accuracy. When once adjusted, there is no liability of the parts loosening, as the strain of the wheel-hub upon the bearing only tends to compress the expanded end of the journal-shaft and bind the screw more tightly in its socket therein. It is obvious, so far as this part of my invention is concerned, that it is immaterial what kind of a bearing is used at the inner end of the wheel-hub; or, so far as the adjustment is concerned, what character of movable bearing is employed. I preferably form the conical bearing-faces of the hub parallel, and correspondingly shape the conical bearing-surfaces, so that one of the cone-bearings envelops one end of the hub and the other projects into it. This construction is compact and the wear of the parts even.

The stud-journal may be screwed into the frame and riveted or secured thereto in any suitable manner.

I am aware that a split expansible conical bearing-surface in which a conically-headed screw is socketed for the purpose of expanding it is old. Under that organization, however, the bearing-surface is of course broken, while by my invention I obtain an unbroken bearing-surface, and the bearing-nut may be renewed at any time.

What I claim as my invention is—

1. The combination of the expansible split-socketed shaft, the movable bearing nut or follower which slides thereon, and the screw or plug, which expands the shaft and binds the follower thereon in any desired position.

2. The combination of the stud-journal shaft, the opposite conical bearings, the expansible split-socketed end of the shaft, the movable bearing or follower which slides thereon, and the expanding screw or plug, substantially as set forth.

3. The combination of the frame or standard, the recessed cone-seat thereon, the hub with projecting cone-bearings, an outer bearing for the hub, and the journal-stud, substantially as described.

4. The combination of the opposite conical bearings having parallel bearing-faces with the wheel-hub having corresponding parallel conical bearing-faces, and means for adjusting the bearings to compensate wear.

In testimony whereof I have hereunto subscribed my name this 22d day of March, A. D. 1883.

GEORGE S. ROMINGER.

Witnesses:
JAMES W. BARR,
E. C. DAVIDSON.